US007483631B2

(12) United States Patent
Ovadia et al.

(10) Patent No.: US 7,483,631 B2
(45) Date of Patent: Jan. 27, 2009

(54) METHOD AND APPARATUS OF DATA AND CONTROL SCHEDULING IN WAVELENGTH-DIVISION-MULTIPLEXED PHOTONIC BURST-SWITCHED NETWORKS

(75) Inventors: Shlomo Ovadia, San Jose, CA (US); Christian Maciocco, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 898 days.

(21) Appl. No.: 10/328,571

(22) Filed: Dec. 24, 2002

(65) Prior Publication Data

US 2004/0120261 A1    Jun. 24, 2004

(51) Int. Cl.
*H04J 14/02*   (2006.01)
*H04B 10/02*   (2006.01)
*H04B 10/12*   (2006.01)

(52) U.S. Cl. ......................... 398/57; 398/48
(58) Field of Classification Search ................. None
See application file for complete search history.

(56) References Cited

U.S. PATENT DOCUMENTS

| 5,457,556 | A  |   | 10/1995 | Shiragaki |         |
|-----------|----|---|---------|-----------|---------|
| 5,940,372 | A  | * | 8/1999  | Bertin et al. | 370/238 |
| 5,970,050 | A  | * | 10/1999 | Johnson   | 370/238 |
| 6,339,488 | B1 | * | 1/2002  | Beshai et al. | 398/59 |
| 6,519,062 | B1 |   | 2/2003  | Yoo       |         |
| 6,542,469 | B1 | * | 4/2003  | Kelley et al. | 370/238 |
| 6,697,333 | B1 | * | 2/2004  | Bawa et al. | 370/238 |
| 6,697,374 | B1 |   | 2/2004  | Shraga et al. |     |
| 6,721,315 | B1 |   | 4/2004  | Xiong et al. |      |
| 6,956,868 | B2 |   | 10/2005 | Qiao      |         |
| 7,242,679 | B1 | * | 7/2007  | Cortez et al. | 370/351 |
| 7,391,732 | B1 | * | 6/2008  | Cortez et al. | 370/238 |

(Continued)

FOREIGN PATENT DOCUMENTS

EP    0 876 076 A2    11/1998

(Continued)

OTHER PUBLICATIONS

Office Action dated Dec. 13, 2005 for related U.S. Appl. No. 10/242,839, filed Sep. 13, 2002 to S. Ovadia.

(Continued)

*Primary Examiner*—Kenneth N Vanderpuye
*Assistant Examiner*—David S Kim
(74) *Attorney, Agent, or Firm*—Blakely, Sokoloff, Taylor & Zafman LLP

(57)    ABSTRACT

A method and apparatus for scheduling data burst transmission in a wavelength-division-multiplexing photonic burst-switched network is disclosed. In one embodiment, a scheduler determines a set of weighting factors at each wavelength for each of the lightpath segments among all the network nodes. These weighting factors may be used to calculate a set of coarse-grained bandwidth allocation factors, one for each potential lightpath formed from the available lightpath segments between an ingress node and an egress node. The scheduler may schedule the transmission of the data burst on one of the lightpaths that has a coarse-grained bandwidth allocation factor which indicates that it can support the requested bandwidth. The scheduler may periodically update the set of weighting factors at each wavelength for each of the lightpath segments.

26 Claims, 8 Drawing Sheets

U.S. PATENT DOCUMENTS

| | | | |
|---|---|---|---|
| 2002/0024700 | A1 | 2/2002 | Yokoyama et al. |
| 2002/0063915 | A1* | 5/2002 | Levandovsky et al. ...... 359/110 |
| 2002/0118419 | A1 | 8/2002 | Zheng et al. |
| 2003/0009582 | A1 | 1/2003 | Qiao et al. |
| 2003/0043430 | A1 | 3/2003 | Handleman |
| 2004/0052525 | A1 | 3/2004 | Ovadia |

FOREIGN PATENT DOCUMENTS

| | | |
|---|---|---|
| EP | 1 135 000 A1 | 9/2001 |
| EP | 1 303 111 A2 | 4/2003 |

OTHER PUBLICATIONS

Office Action dated Jul. 20, 2006 for related U.S. Appl. No. 10/242,839, filed Sep. 13, 2002 to S. Ovadia.

Office Action dated Jan. 12, 2007 for related U.S. Appl. No. 10/242,839, filed Sep. 13, 2002 to S. Ovadia.

Jacob et al., "Delay Perfomance of Some Scheduling Strategies in an Input Queuing ATM with Multiclass Bursty Traffic", IEEE/ACM Transactions on Networking, vol. 4, No. 2, Apr. 1996, pp. 258-271.

Yoo et al., "Optical Burst Switching for Service Differentiation in the Next-Generation Optical Internet", IEEE, Feb. 2001, pp. 98-104.

Final Office Action dated May 17, 2007 for related U.S. Appl. No. 10/242,839, filed Sep. 13, 2002 to S. Ovadia.

Office Action dated Sep. 18, 2007 for related U.S. Appl. No. 10/242,839, filed Sep. 13, 2002 to S. Ovadia.

Guliiemot et al., "Transparent Optical Packet Switching: The European ACTS KEOPS Project Approach", IEEE 1998, Journal of Lighteave Technology, vol. 16, No. 12, Dec. 1998, pp. 2117-2134.

* cited by examiner

OPTICAL DATA BURST FORMAT

OPTICAL CONTROL BURST FORMAT

METHOD AND APPARATUS OF DATA AND CONTROL SCHEDULING IN WAVELENGTH-DIVISION-MULTIPLEXED PHOTONIC BURST-SWITCHED NETWORKS

FIELD

The present disclosure relates generally to optical networking systems, and more specifically to optical networking systems operating in photonic burst-switched modes.

BACKGROUND

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (OEO) conversion of optical signals is done at the optical switches. Performing OEO conversion at each switching node in the optical network is not only a relatively slow operation (typically about ten milliseconds), but is also very costly, consumes a lot of power, and potentially creates a traffic bottleneck for the optical switched network. In addition, the current optical switch technologies cannot efficiently support "bursty" traffic that is often experienced in packet communication applications (e.g., the Internet).

It may be possible to create a network where the OEO conversion at the switching nodes need not be performed. In such a case, the data traffic maybe electronically buffered at the ingress/egress nodes, and their transmission to egress/ingress nodes is placed upon network schedulers. Prior art bandwidth reservation mechanisms may not be adequate for enterprise networks to support the requested bandwidths, as they did not take into account the specific network topology and available resources such as the number of active wavelengths permitted, the lightpath utilization, and many other network parameters.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following disclosure describes techniques for reserving bandwidth and thereby assisting the scheduling of data burst transmissions in a WDM-based photonic burst-switched network. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware and software within a photonic burst-switched network. However, the invention may be practiced in other forms of networks.

Figure 1:
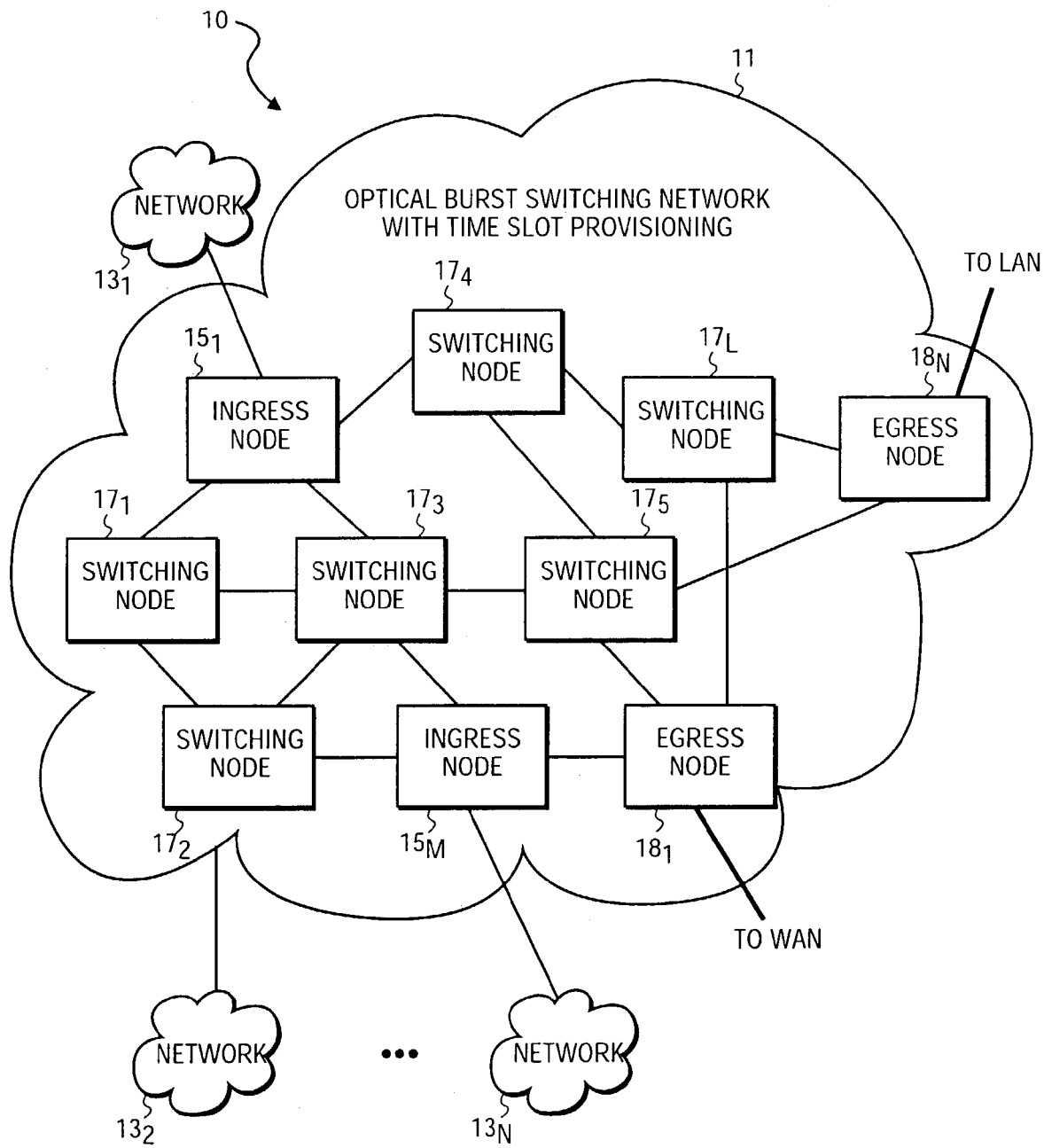
FIG. 1 is a simplified block diagram illustrating a photonic burst switching network, according to one embodiment of the present disclosure.

FIG. 1 illustrates a photonic burst-switched network 10, according to one embodiment of the present disclosure. The term photonic burst is used herein to refer to statistically-multiplexed packets (e.g., internet protocol (IP) packets, Ethernet frames) having similar routing requirements. A photonic burst typically includes a photonic control burst containing the header and other routing, scheduling, or network management information of the IP packets or any other frame and a payload containing the data segments of the packets.

This embodiment of photonic burst-switched network 10 includes an optical metropolitan area network MAN 11, local area networks (LANs) $13_1$-$13_N$ and a backbone optical wide area network WAN (not shown). In addition, this embodiment of optical MAN 11 includes ingress nodes $15_1$-$15_M$, switching nodes $17_1$-$17_L$, and egress nodes $18_1$-$18_N$. Optical MAN 11 may include other ingress nodes, egress nodes, and switching nodes (not shown) that may be interconnected with the switching nodes shown in FIG. 1. In this embodiment, the ingress, egress, and switching nodes may be implemented with intelligent modules.

In this embodiment, ingress nodes $15_1$-$15_M$ may be implemented as label edge routers (LER) with the appropriate optical interface units or modules, where each is configured to receive IP packets or frames (e.g. Ethernet, SONET) from a IAN (via a label edge router (LER) in some embodiments or directly on its interfaces), and, receive optical signals from switching nodes $17_1$-$17_M$ of optical MAN 11. In other embodiments, ingress nodes $15_1$-$15_M$ may be implemented as a server, or as a server farm. In addition, ingress nodes $15_1$-$15_M$ may be configured to transmit optical signals to switching nodes $17_1$-$17_M$ of optical MAN 11. In one embodiment, the ingress nodes may perform optical-electrical (OE) conversion of received optical signals, and include electronic memory to buffer the received signals until they are sent to the appropriate LAN. In another embodiment, the ingress switching nodes may perform electrical-optical (EO) conversion of the received electrical signals before they are transmitted to switching nodes $17_1$-$17_M$ of optical MAN 11. Embodiments of the ingress nodes are described further below.

Egress nodes $18_1$-$18_N$ may be implemented with modules that may be configured to receive optical signals from other nodes of optical MAN 11 and route them to the optical WAN or to a LAN. Egress switching node $18_1$-$18_N$ can also receive optical signals from the optical WAN and send them to the appropriate node of optical MAN 11. In one embodiment, egress node $18_1$-$18_N$ performs optical-electrical-optical (OEO) conversion of received optical signals, and includes electronic memory to buffer received signals until they are sent to the appropriate node of optical MAN 11 (or to the optical WAN). Embodiments of egress node $18_1$-$18_N$ are described further below.

Switching nodes $17_1$-$17_L$ may be implemented with optical switching units or modules that may be each configured to receive optical signals from other switching nodes and appropriately route the received optical signals to other switching nodes of optical MAN 11. As is described below, the core switching nodes perform OEO conversion of optical control bursts and network management control label signals. In some embodiments, these optical control bursts and control labels are propagated only on preselected wavelengths. The preselected wavelengths do not propagate optical "data" burst (as opposed to control bursts and control labels) signals in such embodiments, even though the burst and network management control labels may include necessary information for a particular group of optical data burst signals. In another embodiment, optical control bursts, network management control labels, and optical data burst signals may be propagated on the same wavelength(s) using different encoding schemes such as different modulation formats, etc. In either approach, the optical control bursts and control labels are sent asynchronously relative to its corresponding optical data burst signals. In still another embodiment, the optical control bursts and control signals are propagated at different transmission rates as the optical data signals.

Although switching nodes $17_1$-$17_L$ may perform OEO conversion of the optical control burst signals, in this embodiment, the switching nodes do not perform OEO conversion of the optical data burst signals. Rather, core switching nodes $17_1$-$17_L$ perform purely optical switching of the optical data burst signals. Thus, the switching nodes can include electronic circuitry to store and process the incoming optical control bursts and network management control labels that were converted to an electronic form and use this information to configure the photonic burst switch (PBS) settings, and to properly route the optical data burst signals corresponding to the optical control bursts. The new control bursts, which replace the previous control bursts based on the new routing information, may be converted to an optical control signal, and may then be transmitted to the switching or egress nodes. Embodiments of the core switching nodes are described further below.

The elements of one photonic burst switching network 10 may be interconnected as follows. LANs $13_1$-$13_N$ may be connected to corresponding ones of ingress switching nodes $15_1$-$15_M$ of optical MAN 11.

Within optical MAN 11, ingress nodes $15_1$-$15_M$ and egress node 18 may be connected to some of switching nodes $17_1$-$17_L$ via optical fibers. Switching nodes $17_1$-$17_L$ may also be interconnected to each other via optical fibers in mesh architecture to form a relatively large number of optical paths or links between the ingress nodes, and between ingress nodes $15_1$-$15_L$ and egress nodes $18_1$-$18_N$. Ideally, core switching nodes $17_1$-$17_L$ provide more than one optical path between each end point of optical MAN 11 (i.e., the ingress nodes $15_1$-$15_L$ and egress nodes $18_1$-$18_N$ are endpoints within optical MAN 11). Multiple optical paths between core switching nodes, ingress nodes, and egress nodes may enable fast reroute and protection switching when, for example, one or more nodes fail.

As described below in conjunction with FIG. 2, the ingress, egress and switching nodes of optical MAN 11 may be configured to send and/or receive optical control bursts, optical data bursts, and other control signals that are wavelength multiplexed so as to propagate the optical control bursts and control labels on pre-selected wavelength(s) and optical data bursts or payloads on different preselected wavelength(s). In addition, optical data bursts may be time division multiplexed (TDM) on a given wavelength. Still further, the endpoints of optical MAN 11 may send optical control burst signals when sending data out of optical MAN 11.

Figure 2:
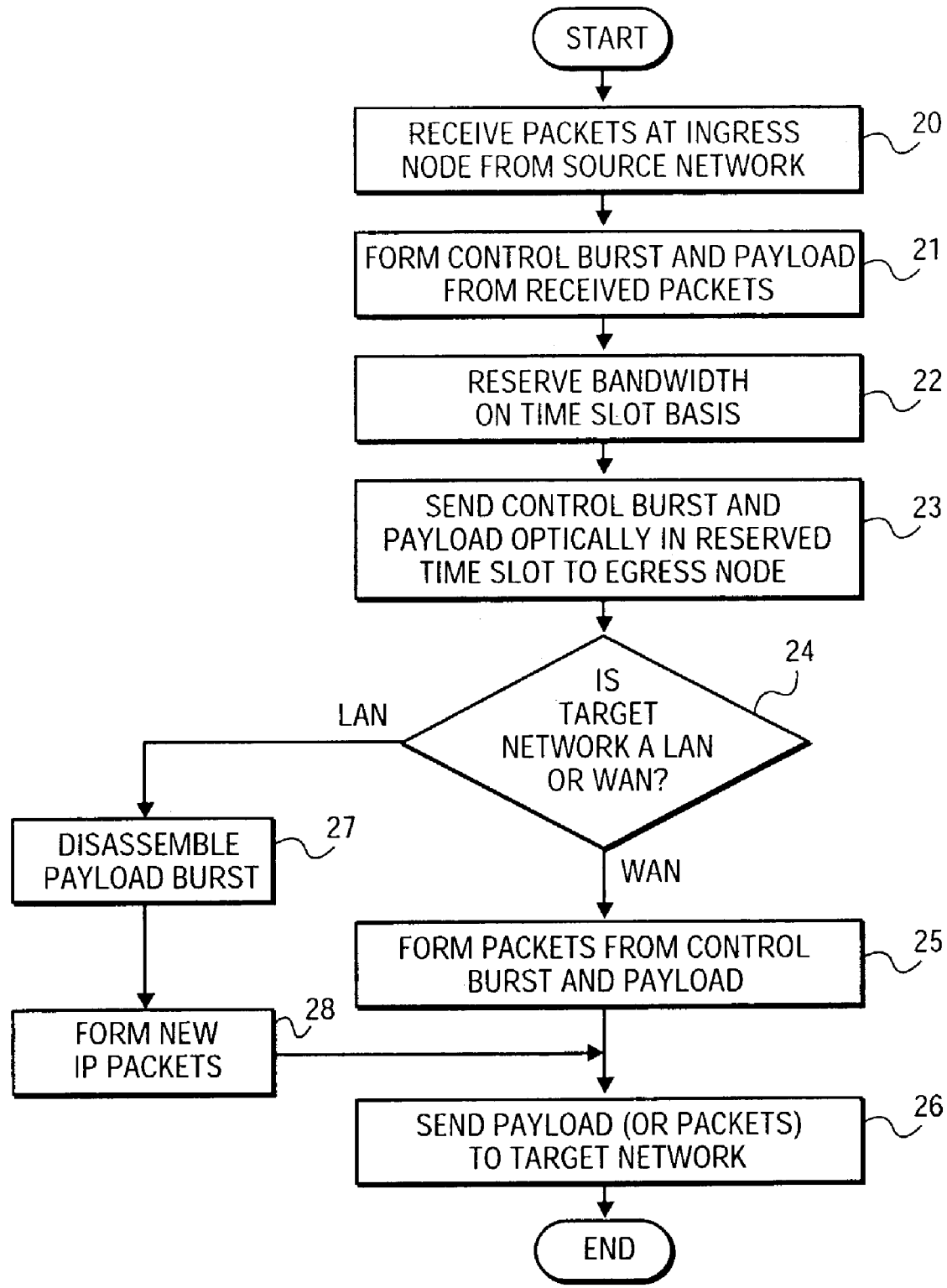
FIG. 2 is a simplified flow diagram illustrating the operation of a photonic burst switching network, according to one embodiment of the present disclosure.

FIG. 2 illustrates the operational flow of photonic burst switching network 10, according to one embodiment of the present disclosure. Referring to FIGS. 1 and 2, photonic burst switching network 10 operates as follows.

Optical MAN 11 receives packets from LANs $13_1$-$13_N$. In one embodiment, optical MAN 11 receives IP packets at ingress nodes $15_1$-$15_M$. The received packets may be in electronic form rather than in optical form, or received in optical form and then converted to electronic form. In this embodiment, the ingress nodes store the received packets electronically. A block 20 represents this operation.

For clarity, the rest of the description of the operational flow of photonic burst switching network 10 focuses on the transport of information from ingress node 151 to egress node 181. The transport of information from ingress nodes 152-15M to one of the egress nodes $18_1$-$18_N$ may be substantially similar.

An optical control burst and payload (i.e., an optical data burst) is formed from the received packets. In one embodiment, ingress node $15_1$ uses statistical multiplexing techniques to form the optical data burst from the received IP (Internet Protocol) packets or frames (Ethernet, SONET, etc) stored in ingress node $15_1$. For example, packets received by ingress node $15_1$ and having to pass through egress node $18_1$ on their paths to a destination may be assembled into an optical data burst. A block 21 represents this operation.

Bandwidth may be reserved on a specific wavelength to transport the optical data burst through photonic burst switching network 10. In one embodiment, ingress node $15_1$ reserves a time slot (e.g., a TDM channel of a TDM system) in an optical data signal path through photonic burst switching network 10. Further, in one embodiment, the bandwidth is reserved for a time period sufficient to transport the optical burst from the ingress node to the egress node. For example, in some embodiments, the ingress, core, and egress nodes maintain an updated list of all used and available time slots. The time slots may be allocated and distributed over multiple wavelengths and optical fibers. Thus, a reserved time slot (also referred to herein as a TDM channel, which in differing embodiments may be either fixed-duration or variable duration TDM channels) may be in one wavelength of one fiber, or may be spread across multiple wavelengths and multiple optical fibers. A block 22 represents this operation.

When an ingress and/or egress node reserves bandwidth on a specific wavelength or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which may be periodically broadcasted to all the ingress, switching, and egress nodes, may be transmitted on the same wavelength as the optical control bursts or on a different common preselected wavelength throughout the optical network. The network controller function may reside in one of the ingress and egress nodes or may be distributed across two or more ingress and egress nodes. In this embodiment, the network controller also resides in the switching node (e.g., processors 82 or 83 of FIG. 8).

The optical control bursts, network management control labels, and optical data bursts may be then transported through photonic burst switching network 10 in the reserved variable-duration TDM channels. That is, each of the reserved time slots may have different time durations, depending on the data burst lengths. In one embodiment, ingress node $15_1$ transmits the control burst to the next switching node along the optical label-switched path (OLSP) determined by the network controller. In this embodiment, the network controller uses a constraint-based routing protocol (e.g., multi-protocol label switching MPLS) over one or more wavelengths to determine the best available OLSP to the egress node. In one embodiment, ingress node $15_1$ then asynchronously transmits the optical data burst to the destination egress node through switching nodes $17_1$-$17_L$, where little or no time delay due to buffering or OEO conversion occurs at each switching node.

In some embodiments, the switching node may perform OEO conversion of the optical control burst so that the node may extract and process the routing information contained in the control burst. Further, in some embodiments, the variable-duration TDM channel may be propagated in the same wavelengths that are used for propagating control bursts. Alternatively, the control bursts and payloads may be modulated on the same wavelength in the same optical fiber using different modulation formats. For example, optical control bursts may be transmitted using non-return-to-zero (NRZ) modulation format, while optical payloads may be transmitted using return-to-zero (RZ) modulation format. The optical burst is transmitted from one switching node to another switching node in a similar optical MAN until the optical burst is terminated at egress node $18_1$. A block 23 represents this operation.

The operational flow at this point depends on whether the target network is an optical WAN or a LAN. A block 24 represents this branch in the operational flow.

If the target network is an optical WAN, new optical control burst and payload signals may be formed. In this embodiment, egress node 181 prepares the new optical control burst and payload signals. A block 25 represents this operation.

The new optical control burst and payload may then be transmitted to the target network (i.e., WAN in this case). In this embodiment, egress node 181 includes an optical interface to transmit the optical control burst and payload to the optical WAN. A block 26 represents this operation.

However, if in block 24 the target network is a LAN, the optical data burst is disassembled to extract the IP packets or frames. In this embodiment, egress node 181 converts the optical data burst to electronic signals that egress node $18_1$ may process to recover the data segment of each of the packets. A block 27 represents this operation.

The extracted IP data packets or frames may be processed, combined with the corresponding IP labels, and then routed to the target network (i.e., LAN in this case). In this embodiment, egress node $18_1$ forms these new IP packets. A block 28 represents this operation. The new IP packets may then be transmitted to the target network (i.e., LAN) as shown in block 26.

Photonic burst switching network 10 may achieve increased bandwidth efficiency through the additional flexibility afforded by the TDM channels. Although this embodiment described above includes an optical MAN having ingress, switching, and egress nodes to couple multiple LANs to an optical WAN backbone, in other embodiments the networks do not have to be LANs, optical MANs or WAN backbones. That is, optical MAN 11 need not service a "metropolitan area". Rather, photonic burst switching network 10 may include a number of relatively small networks that are coupled to a relatively larger network that in turn is coupled to a backbone network.

Figure 3:
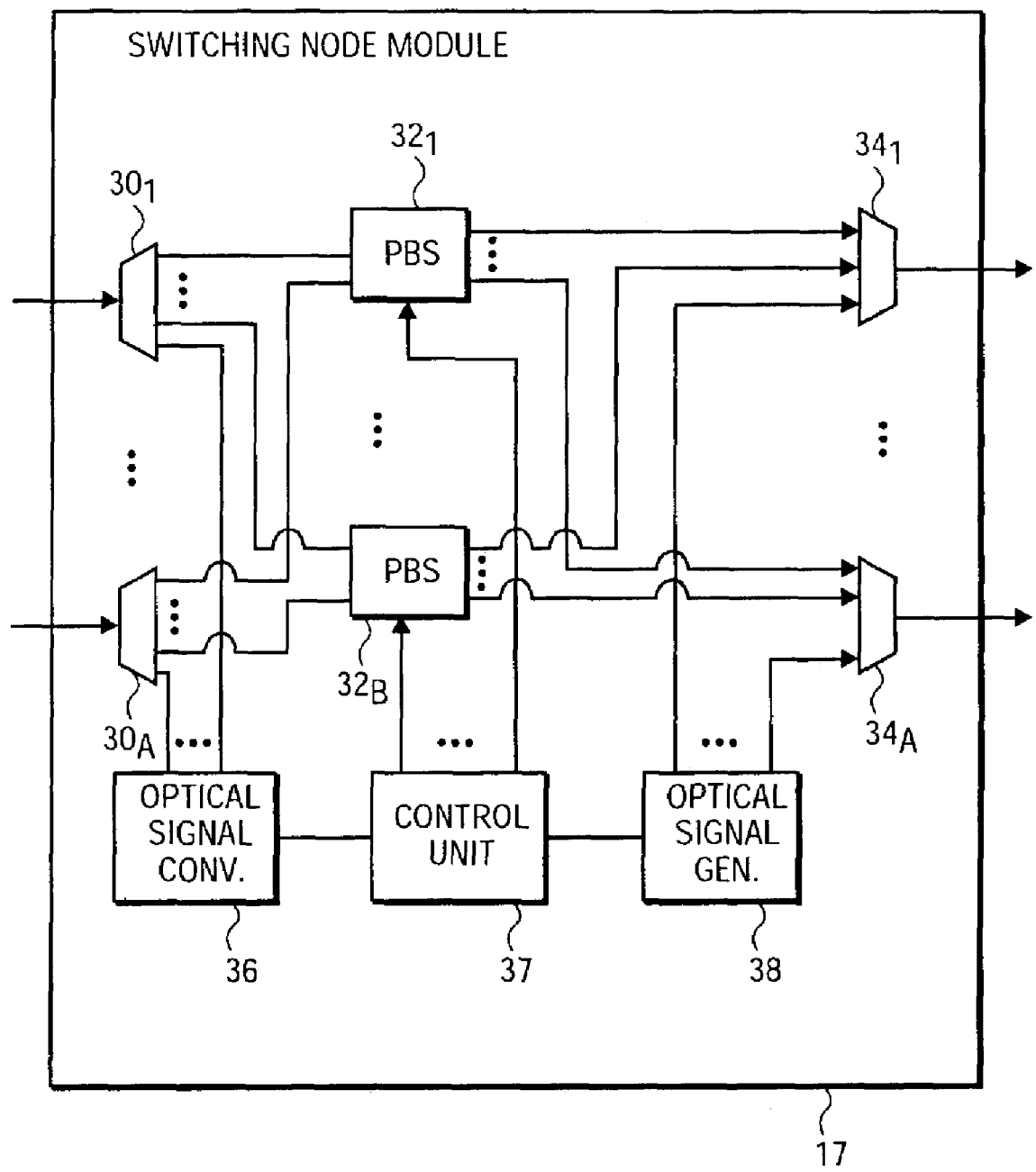
FIG. 3 is a block diagram illustrating a core switching node module for use in a photonic burst switching network, according to one embodiment of the present disclosure.

FIG. 3 illustrates a module 17 for use as a switching node in photonic burst switching network 10 (FIG. 1), according to one embodiment of the present disclosure. In this embodiment, module 17 includes a set of optical wavelength division demultiplexers $30_1$-$30_A$, where A represents the number of input optical fibers used for propagating payloads, control bursts, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+ 1. For embodiments in which N is greater than A·C, the extra input/output ports may be used to loop back an optical signal for buffering.

Further, although photonic burst switches $32_1$-$32_B$ are shown as separate units, they may be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control interface unit 37, and a set of electrical-to-optical signal generators 38 (e.g., lasers).

The elements of this embodiment of module 17 may be interconnected as follows. Optical demultiplexers $30_1$-$30_A$ may be connected to a set of A input optical fibers that propagate input optical signals from other switching nodes of photonic burst switching network 10 (FIG. 10). The output leads of the optical demultiplexers may be connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ may be connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also has an input lead connected to an output lead of electrical-to-optical signal generator 38. Control unit 37 has an input lead or port connected to the output lead or port of optical-to-electrical signal converter 36. The output leads of control unit 37 may be connected to the control leads of photonic burst switches $32_1$-$32_B$ and electrical-to-optical signal generator 38. As described below in conjunction with the flow diagram of FIG. 5, module 17 is used to receive and transmit optical control bursts, optical data bursts, and network management control labels. In one embodiment, the optical data burst and optical control bursts have transmission formats as shown in FIGS. 4A and 4B.

Figure 4A:
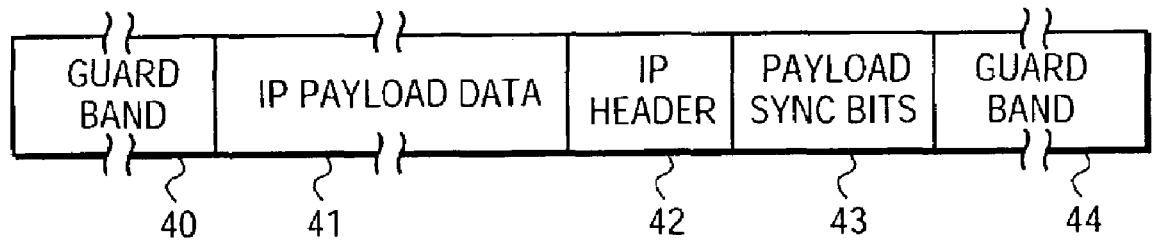
FIGS. 4A and 4B are diagrams illustrating the format of an optical data burst and an optical control burst for use in a photonic burst-switched network, according to one embodiment of the present disclosure.

FIG. 4A illustrates the format of an optical data burst for use in photonic burst switching network 10 (FIG. 1), according to one embodiment of the present disclosure. In this embodiment, each optical data burst has a start guard band 40, an IP payload data segment 41, an IP header segment 42, a payload sync segment 43 (typically a small number of bits), and an end guard band 44 as shown in FIG. 4A. IP payload data segment 41 includes the statistically-multiplexed IP data packets used to form the burst. Although FIG. 4A shows the payload as contiguous, module 17 transmits payloads in a TDM format. Further, in some embodiments the data burst may be segmented over multiple variable-duration TDM channels. It should be pointed out that in this embodiment the optical data bursts and optical control bursts have local significance only at the optical MAN, and may lose their significance at the optical WAN.

Figure 4B:
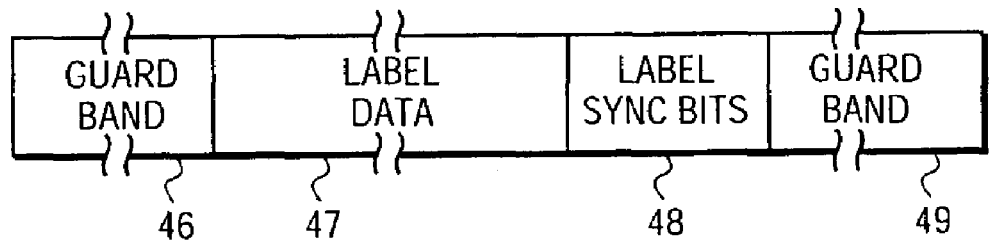

FIG. 4B illustrates the format of an optical control burst for use in photonic burst switching network 10 (FIG. 1), according to one embodiment of the present disclosure. In this embodiment, each optical control burst has a start guard band 46, an IP label data segment 47, a label sync segment 48 (typically a small number of bits), and an end guard band 49 as shown in FIG. 4B. In this embodiment, label data segment 47 contains all the necessary routing and timing information of the IP packets or frames to form the optical burst. Although FIG. 4B shows the control burst as contiguous, in this embodiment module 17 transmits control bursts in a TDM scheme.

In some embodiments, an optical network management control label (not shown) is also used in photonic burst switching network 10 (FIG. 1). In such embodiments, each optical network management control label includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control label is transmitted in a TDM scheme.

Figure 5:
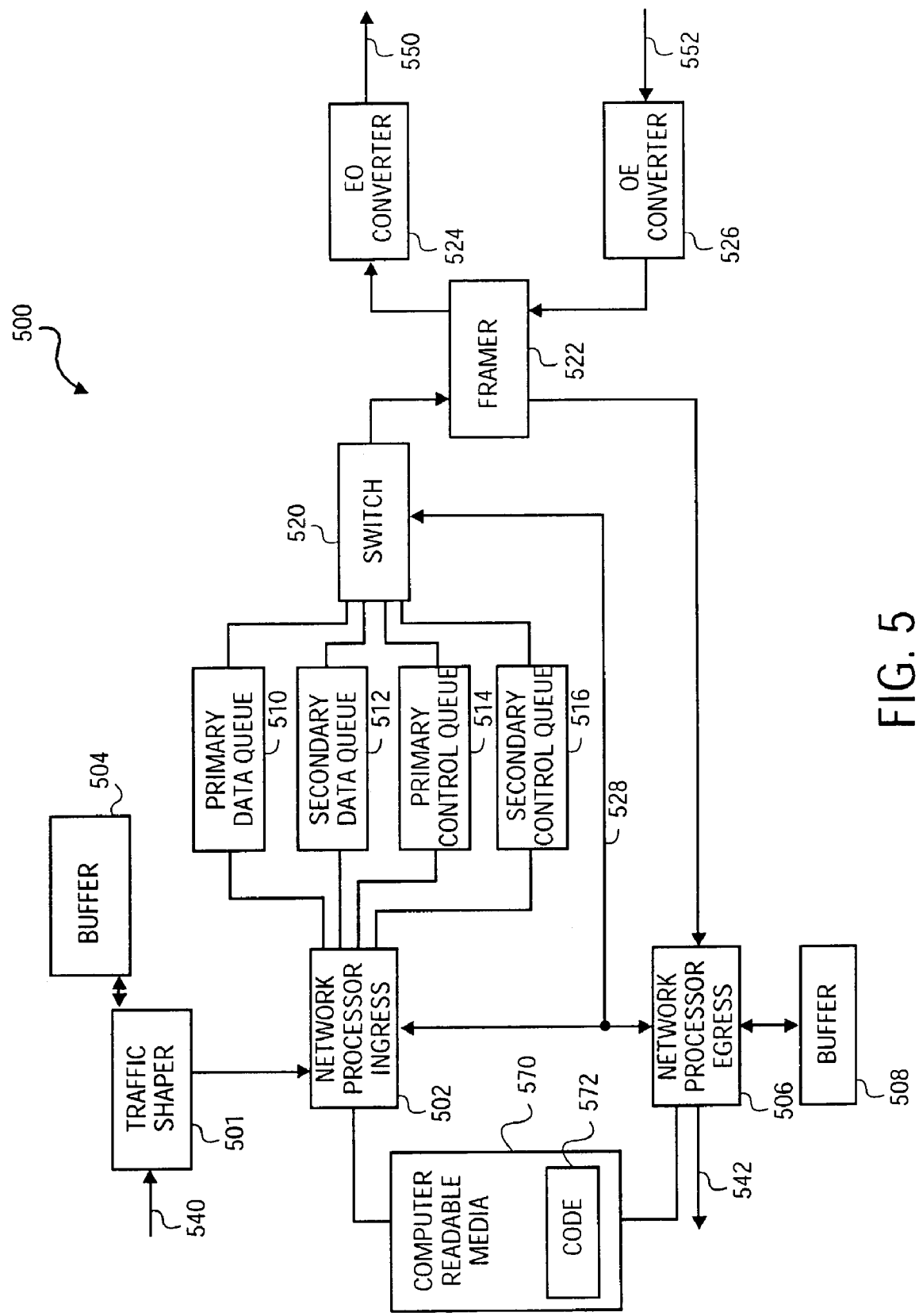
FIG. 5 is a simplified block diagram architecture of certain portions of an edge router, that may be used as an ingress node or egress node, showing various features such as a traffic shaper and multiple queues, according to one embodiment of the present disclosure.

FIG. 5 is a simplified block diagram architecture of certain portions of an edge router 500, that may be used as either an ingress node or egress node, according to one embodiment of the present disclosure. Various features are shown, such as a traffic shaper 501 and multiple data and control queues 510, 512, 514, 516. In other embodiment, such features may not be used or such functions may be implemented in other circuits. The edge router 500 may be utilized as either an ingress node 15 or an egress node 18 of the FIG. 1 embodiment. In other embodiments, the portions shown in FIG. 5 may be used in a server, or in a server farm, that may again be used functionally as an ingress node or egress node. The edge router 500 may be used to support retransmission of control and data bursts when necessary.

IP packets (or frames) from multiple users and/or sources may arrive on signal line 540 for the traffic shaper module 501. The IP packets may be buffered in buffer 504 as necessary. The traffic shaper 501 may be used before the incoming IP packets are assembled to reduce or eliminate the traffic correlation structure and degree of self-similarity. Thus, traffic burstiness reduction may improve contention resolution at the switching nodes and traffic performance. In one embodiment, the IP packets may be assembled into IP payload data 41 and label data 47 within data bursts and control bursts, respectively, by network processor ingress module 502. The network processor ingress module 502 may then place the data bursts and control bursts in transmission order into the primary data queue 510 and primary control queue 514. The outputs of the queues may be selected by a switch 520 for transmission via framer 522. Leaving the framer 522 in electrical format, the data and control bursts may enter the optical MAN via the electrical to optical converter 524.

Data arriving from the optical MAN may enter edge router 500 via an optical to electrical converter 526. Once the data and control bursts are available to the framer 522 in electrical format, the framer 522 may supply them to network processor egress module 506 where they are deframed and demultiplexed into IP packets.

In order to more conveniently provide for the retransmission of data and control bursts upon request, edge router 500 may also contain a secondary data queue 512 and secondary control queue 516. The secondary data queue 512 and secondary control queue 516 may contain backup copies of data and control bursts. These backup copies may be needed when the copies of the data and control bursts within primary data queue 510 and primary control queue 514 may be deleted upon successful transmission of the data bursts.

In one embodiment, edge router 500 may include a computer-readable media 570 which may include program code 572. This program code 572 may include updated operational software for use in network processor ingress module 502 and network processor egress module 506. Computer-readable media 570 may in some embodiments be a hard disk drive, a floppy disk drive, an optical disk drive, including compact disk read-only memory (CD-ROM) or versatile digital disk read-only memory (DVD-ROM), an electro-optical disk drive, a read-only memory (ROM) module, a flash memory module, or a network interface.

Figures 6A, 6B:
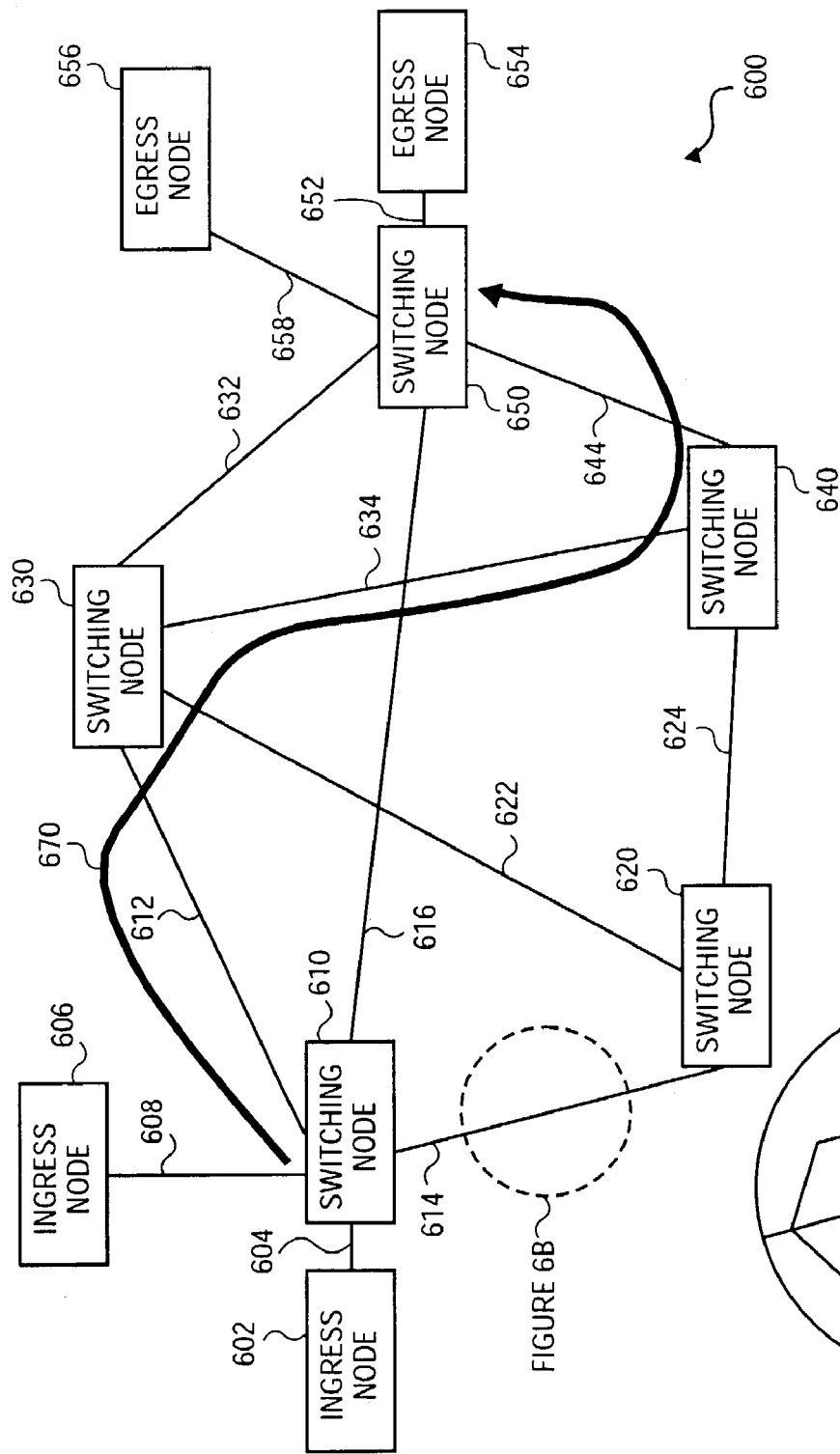
FIGS. 6A and 6B are diagrams illustrating a method of selecting a lightpath in a five switching node photonic burst switching network, according to one embodiment of the present disclosure.

FIGS. 6A and 6B are diagrams illustrating a method of selecting a lightpath in a photonic burst switching network 600, according to one embodiment of the present disclosure. FIG. 6A shows two ingress nodes 602, 606, two egress nodes 654, 656, and five switching nodes 610, 620, 630, 640, 650 for the sake of clarity. In other embodiments there may be many more ingress nodes, egress nodes, and switching nodes. In one embodiment, ingress nodes 602, 606 and egress nodes 654, 656 may be an edge router (i.e., LER) such as edge router 500 of FIG. 5. In other embodiments, ingress nodes 602, 606 and egress nodes 654, 656 may be implemented as a server, or as a server farm. Also shown are several optical fibers, 604, 608, 612, 614, 616, 622, 624, 632, 634, 644, 652, and 658 connecting the various nodes. Each of the optical fibers may support one or more lightpaths between ingress node 602 and egress node 654. For example, photonic burst switching network 600, and specifically optical fiber 614, may support transmissions on three wavelengths, $\lambda_1, \lambda_2, \lambda_3$. Let a lightpath segment be defined as any portion of a lightpath existing either between two switching nodes, between a switching node and an ingress node, or between a switching node and an egress node. FIG. 6B shows schematically how three lightpath segments 660, 662, 664, corresponding to $\lambda_1, \lambda_2, \lambda_3$, respectively, may be carried by optical fiber 614. In other embodiments, there may be fewer than three or more than three wavelengths supported in a network.

In one embodiment, each lightpath segment may be assigned a weighting factor $\alpha_{ij}(\lambda_k)$, denoting that the weighting factor is assigned to the optical fiber from node i to node j on wavelength k. The use of a set of weighting factors may permit the determination of the likely lightpath segments, for transmitting a data burst that takes into consideration the network topology, network traffic statistical data, available network resources, as well as operator policies. These network traffic statistical data may include wavelength bandwidth utilization, class of service on each available wavelength, traffic load factors, and other data based upon observations of network traffic. In one embodiment, the set of weighting factors $\alpha_{ij}(\lambda_k)$ may be predetermined and used as initialization values during the establishment of network operations.

In one embodiment, the weighting factors $\alpha_{ij}(\lambda_k)$ may be modified as necessary during network operations to reflect changes in network traffic. For example, the weighting factor $\alpha_{ij}(\lambda_k)$ of a heavily loaded lightpath segment may be reduced, in order to reduce future traffic loading, and to prevent traffic congestion or even loss of data on the heavily congested lightpath segments. The ingress node 602 may maintain a set of the weighting factors $\alpha_{ij}(\lambda_k)$ to aid in its scheduling of the transmission of data bursts. In one embodiment the switching nodes 610, 620, 630, 640, 650 may track and maintain a record of network usage and network traffic statistics. From time to time the switching nodes 610, 620, 630, 640, 650 may send this network traffic statistical data to the ingress node 602 in a network management control label. Ingress node 602 may then use this data to determine updated weighting factors $\alpha_{ij}(\lambda_k)$. In other embodiments, the switching nodes 610, 620, 630, 640, 650 may determine the updated weighting factors $\alpha_{ij}(\lambda_k)$ and transmit them to the ingress node 602.

The weighting factors $\alpha_{ij}(\lambda_k)$ may be combined with other bandwidth reservation mechanisms to support the scheduling of data burst transmissions. In one embodiment, let $B_{ij}(\lambda_k)$ denote the average bit-rate between nodes i and j. Let $B_i$ denote the average bit-rate among all the switching nodes between the i'th pair of ingress and egress nodes, and among all wavelengths. Then a fine-grained bandwidth allocation factor $f_{ij}(\lambda_k)$ may be calculated as:

$$f_{ij}(\lambda_k) = \alpha_{ij}(\lambda_k)[B_{ij}(\lambda_k)/B_i] \quad \text{Equation (1).}$$

The calculation may in one embodiment be performed in the ingress node 602. It may be useful to consider fine-grained bandwidth allocation factor $f_{ij}(\lambda_k)$ as the fraction of the total bandwidth allocated between nodes i and j on wavelength k at any given time.

The fine-grained bandwidth allocation factors $f_{ij}(\lambda_k)$ may be calculated for all of the lightpath segments on wavelength k at any given time in a given network. It may not be necessary to re-calculate the fine-grained bandwidth allocation factor $f_{ij}(\lambda_k)$ until such time as one or more of the weighting factors $\alpha_{ij}(\lambda_k)$ are updated. When an ingress node 602 considers the various lightpaths available for transmitting data bursts to the i'th egress node 654, it may sum up the individual fine-grained bandwidth allocation factors $f_{ij}(\lambda_k)$ of the component lightpath segments to form a coarse-grained bandwidth allocation factor $f_{ij}(\lambda_k)$ for the lightpath. The coarse-grained bandwidth allocation factor for wavelength k $f_i(\lambda_k)$ may be calculated as:

$$f_i(\lambda_k) = [1/B_i] \sum_{j=1}^{i} a_{ij}(\lambda_k) B_{ij}(\lambda_k). \quad \text{Equation (2)}$$

Here in Equation (2) the summation is over all the possible lightpath segments between ingress node 602 and egress node 654, which form a lightpath.

As an example, first assign index 1 to ingress node 602, index 2 to switching node 610, index 3 to switching node 630, index 4 to switching node 640, index 5 to switching node 650, and index 6 to egress node 654. Then consider a simple lightpath over optical fiber 616 between nodes with indices 2 and 5 and at wavelength $\lambda_1$. The coarse-grained bandwidth allocation factor for this lightpath is simply $f_2(\lambda_1)=[\alpha_{12}(\lambda_1)[B_{12}(\lambda_1)+\alpha_{25}(\lambda_1)[B_{25}(\lambda_1)+\alpha_{56}(\lambda_1)[B_{56}(\lambda_1)]]/B_2$. For a slightly more complicated lightpath 670 over optical fibers 604, 612, 634, 644, and 652 at wavelength $\lambda_1$, the coarse-grained bandwidth allocation factor for this lightpath 670 is $f_1(\lambda_1)=[\alpha_{12}(\lambda_1)[B_{12}(\lambda_1)+\alpha_{23}(\lambda_1)[B_{23}(\lambda_1)+\alpha_{34}(\lambda_1)[B_{34}(\lambda_1)+\alpha_{45}(\lambda_1)[B_{45}(\lambda_1)+\alpha_{56}(\lambda_1)[B_{56}(\lambda_1)]]/B_3$. For any combination of lightpath segments that form a lightpath between an ingress node and an egress node, the corresponding coarse-grained bandwidth allocation factor may similarly be calculated.

A scheduler within ingress switching node 602 may utilize the calculated values of the coarse-grained bandwidth allocation factors. In one embodiment the scheduler may be a portion of network processor ingress module 502. Due to transmission timing and synchronization uncertainties, the requested bandwidth may be generally larger than just the data burst length. If the scheduler determines that there are one or more lightpaths with a high enough value of coarse-grained bandwidth allocation factor to meet the requested bandwidth, then the scheduler may select the lightpath which has the smallest coarse-grained bandwidth allocation factor with the same class of service as the requested bandwidth.

In one embodiment, the scheduler may first assign a particular wavelength to the data burst. The assigned wavelength may be selected to match the transmission priority of the requested bandwidth for that data burst's length. The lightpaths using that wavelength may be examined to see if one or more lightpaths possess a high enough value of coarse-grained bandwidth allocation factor to accept the given burst length. If there are one or more lightpaths, then the scheduler may schedule the transmission of the data burst along one of those lightpaths. If not, then an alternate wavelength may be considered. The lightpaths using that alternate wavelength may then be examined to see if one or more lightpaths possess a high enough value of coarse-grained bandwidth allocation factor to meet the requested bandwidth. If there are one or more of these alternate lightpaths, then the scheduler may schedule the transmission of the data burst along the lightpaths that first match the class of service of the requested bandwidth. If there is no lightpath that matches the priority of the requested bandwidth, then the scheduler may choose other available wavelengths.

If, however, there are no suitable lightpaths utilizing the alternate wavelength, then in a first embodiment the scheduler may select to delay the transmission of the requested bandwidth to a later time. The size of the delay time may be adjusted until a suitable lightpath is found.

In a second embodiment, the scheduler may select to break the data burst into two or more data burst segments. The scheduler may repeat the above process to determine whether there are lightpaths capable of accepting the data burst segments for transmission. In one embodiment the scheduler may seek the smallest number of such segments that may be transmitted. The transmitted segmented data burst maybe assembled into IP packets at the egress node 654.

In a third embodiment, the scheduler may consider lightpaths consisting of lightpath segments with different wavelengths. In this embodiment, some of the switching nodes may have the ability to receive data bursts on one wavelength, convert the data burst to another wavelength, and then send the data burst on the other wavelength. In some embodiments this may be accomplished using a tunable wavelength converter (TWC). Then lightpaths consisting of lightpath segments with different wavelengths may be examined to see if one or more lightpaths possess a high enough value of coarse-grained bandwidth allocation factor to accept the given burst length.

In one embodiment, the weighting factors $\alpha_{ij}(\lambda_k)$ may be further dependent upon other factors. For example, the weighting factors $\alpha_{ij}(\lambda_k)$ may be dependent upon offset time, where offset time is the time between a control burst and its corresponding data burst. In some embodiments a high priority data burst may be assigned a larger offset time. Therefore a weighting factor $\alpha_{ij}(\lambda_k)$ corresponding to the larger offset may be increased.

In some embodiments, the method described above may be used in combination with other bandwidth reservation mechanisms that may be well-known in the art. Examples of such bandwidth reservation mechanisms may be a just-in-time JIT mechanism, a reserve-a-limited-duration RLD mechanism, or a reserve-a-fixed-duration RFD mechanism. A JIT mechanism may be used when the burst length is unknown, and only the starting time is know. A trailing control packet may be used to end the burst. In a RLD mechanism, only the expected end time of the burst is known, and bandwidth reservation may start immediately upon the arrival of the control packet. In the RFD mechanism, both the data burst start time and end time may be known, and the latest unused data burst channel may be selected.

Figure 7:
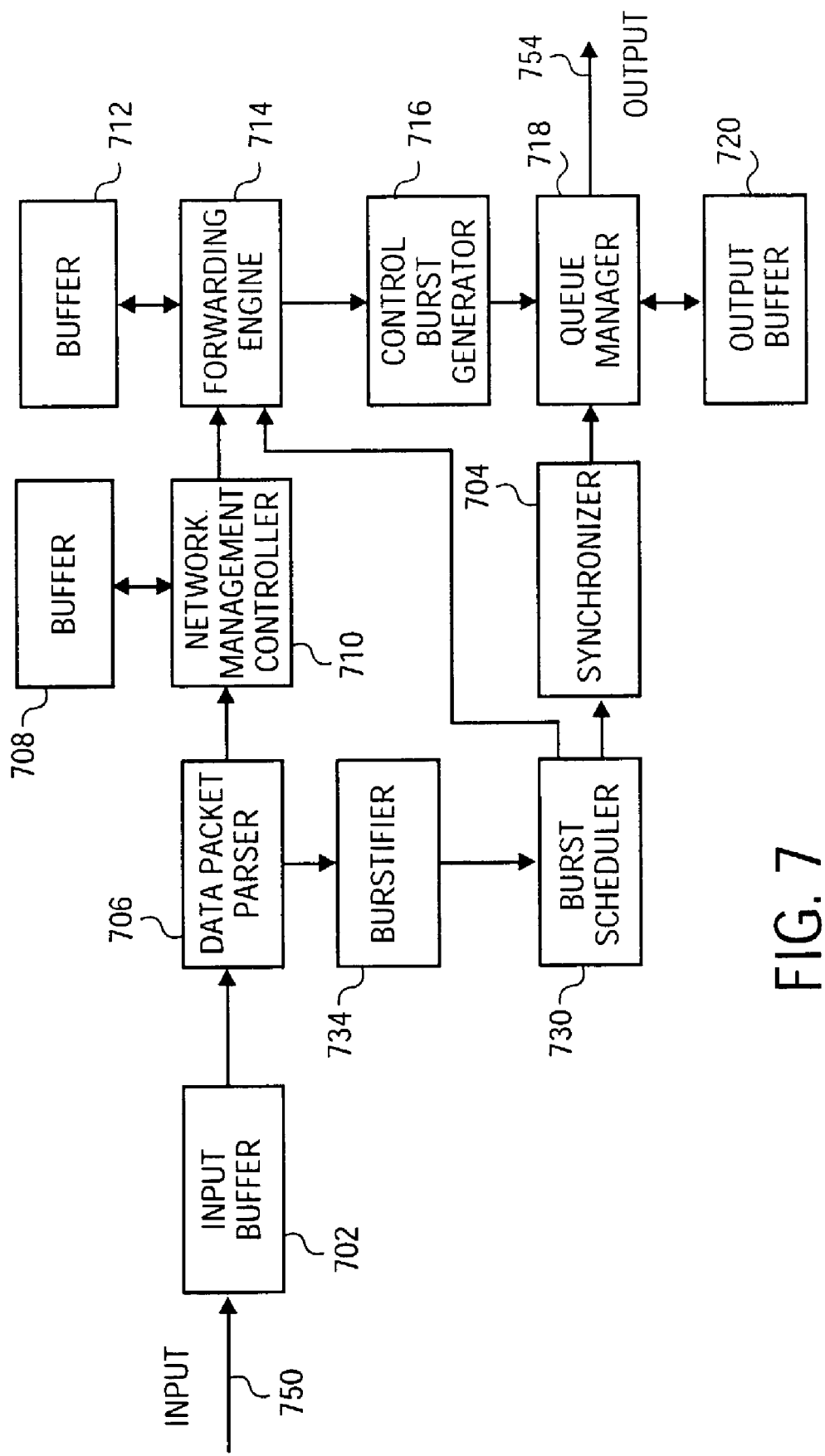
FIG. 7 is a simplified block diagram of software modules for use in an ingress node or egress node such as the edge router shown in FIG. 5, according to one embodiment of the present disclosure.

FIG. 7 is a simplified block diagram of software modules 700 for use in an ingress node or egress node such as the edge router shown in FIG. 5, according to one embodiment of the present disclosure. In other embodiments the software modules 700 may be used in a server or in a server farm. The software modules 700 may process data packets in electronic form on input 750 connected to input buffer 702. The data packets may then be processed in the data packet parser 706. In one embodiment, the data packet parser 706 may deframe the incoming data packets, and then parse the header and other routing information from the data packets. The burstifier 734 may generate control bursts and data bursts from the received control and data packets from the parser 706. The control burst information may also include the data burst size, burst start and arrival times, arrival wavelength, source and destination addresses, forward equivalent class (FEC), burst priority, control burst offset time, and other relevant routing information. In another embodiment, the data packet parser 706 may classify the incoming data packets based on the extracted information before sending them to burst scheduler 730.

In another embodiment, the data packet parser 706 may additionally perform a cyclic redundancy check (CRC) on the incoming data packet. If the CRC fails on a particular data packet, then the data packet parser 706 may generate a negative acknowledgement (NACK) for transmission back to the originator of the data packet. The originator upon receiving a NACK may then retransmit the failing control burst.

In one embodiment a synchronizer 704 may be connected between the output of the burst scheduler 730 and the queue manager 718. Synchronizer 704 may determine the synchronization of data packets by examining the time stamp within the data packet and comparing it to a local clock. Synchronizer 704 may then maintain synchronization between the incoming data packets and the newly-generated outgoing control bursts and data bursts.

Another function of the synchronizer 704 may in one embodiment be to maintain global synchronization with neighboring switching nodes as well as the ingress and/or egress nodes. In one embodiment such synchronization may be maintained by sending special sync messages to the neighboring switching nodes. The neighboring switching nodes may respond to the special sync messages by returning an acknowledgement message.

Finally, in one embodiment synchronizer 704 may assist in initializing optical MAN 11 of FIG. 1. It may do this by initializing and maintaining synchronization of software modules 700 with the routers on the edges of optical MAN 11, such as ingress nodes 15 or egress nodes 18.

Burst scheduler 730 may schedule the transmission of data bursts to the next switching node or along a lightpath to an egress node. The scheduling may be accomplished using the method described above in connection with FIGS. 6A and 6B.

In one embodiment the network management controller 710 may be responsible for acting on the network configuration messages exchanged among the various ingress nodes, egress nodes, and switching nodes. As part of this functionality, network management controller 710 may maintain a lookup table of current status, including list of the available variable duration TDM channels, source and destination addresses, wavelength usage, overall network traffic conditions, and updated status of available network resources. Network management controller 710 may also control the filling of the input buffer 702 by sending a NACK back to the source of the data packets.

The forwarding engine 714 may gather the necessary control information produced in the network management controller 710 and burst scheduler 730. The forwarding engine 714 in one embodiment may select the next switching node through which to route the control and data bursts. This selection may be based in part upon destination address information within the control burst concerning the label-switched path (LSP). The forwarding engine 714 may also perform control label swapping. Control label swapping (routing information on a given wavelength for the next switching node) may be based upon updated destination addresses and the selected wavelength.

Using information presented by the forwarding engine 714, the control burst generator 716 in one embodiment produces the outgoing control bursts as established by the burst scheduler 730. The control burst generator 716 may also produce the control bursts for any PBS network configuration messages produced by the network management controller 710.

Finally, a queue manager 718 may produce a time sequenced output stream of control bursts. The outgoing control bursts may be sorted according to their relative priorities, destination addresses, and other network management priorities. During times of high traffic load, queue manager 718 may place lower-priority control bursts and network management labels into an output buffer 720 for temporary storage. In other embodiments, control bursts with a relatively longer time offset between control burst and data burst may also be stored within output buffer 720 when required.

Figure 8:
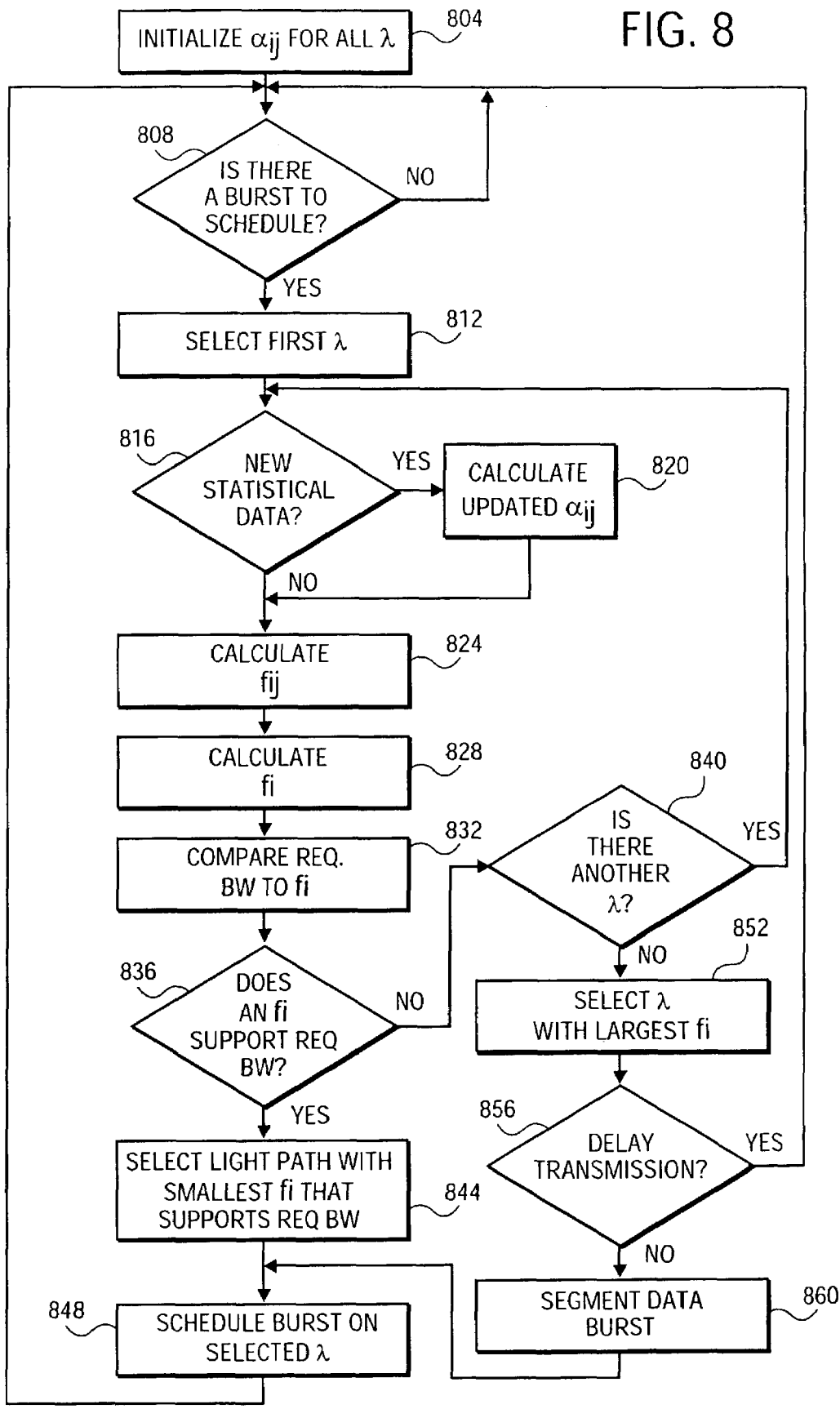
FIG. 8 is a flowchart diagram of a method discussed in connection with FIGS. 6A and 6B, according to one embodiment of the present disclosure.

FIG. 8 is a flowchart diagram of a method discussed in connection with FIGS. 6A and 6B, according to one embodiment of the present disclosure. In one embodiment, the method of FIG. 8 may be performed in an ingress node, which may be the edge router 500 of FIG. 5.

The process may begin with the initialization of a set of weighting factors $\alpha_{ij}(\lambda_k)$ for all transmission wavelengths in block 804. These weighting factors $\alpha_{ij}(\lambda_k)$ may be default values stored locally or they may be derived values from a previous use of the network. Then in decision block 808, the process determines whether a data burst is available that creates the need for scheduling a transmission with an associated requested bandwidth. If so, then decision block 808 exits along the YES path, and in block 812 a first wavelength is selected on which to attempt to schedule the transmission of the requested data burst. This first wavelength upon which to attempt to schedule the transmission may be selected to match a transmission priority of the requested bandwidth. Here some wavelengths may be reserved for higher-priority transmissions while other wavelengths may be reserved for lower-priority transmissions. However, if the result of decision block 808 is negative, then the decision block 808 exits along the NO path and returns to the input of decision block 808.

After the selection of a wavelength for consideration, the process then determines in decision block 816 whether or not new network statistical data has arrived. If so, then decision block 816 exits along the YES path and in block 820 new values of the weighting factors $\alpha_{ij}(\lambda_k)$ may be calculated. However, if no new network statistical data has arrived, then decision block 816 exits along the NO path. In both cases the process moves on to block 824.

In block 824, the weighting factors $\alpha_{ij}(\lambda_k)$ may then be used to calculate a set of fine-grained bandwidth allocation factors $f_{ij}(\alpha_k)$ for the wavelength currently under consideration. Once the set of fine-grained bandwidth allocation factors $f_{ij}(\lambda_k)$ are calculated, then in block 828 they may be used to calculate a set of coarse-grained bandwidth allocation factors $f_i(\lambda_k)$ for the various possible lightpaths of the wavelength currently under consideration.

Then in block 832 the requested bandwidth is compared to each of the various coarse-grained bandwidth allocation factors $f_i$ corresponding to the wavelength currently under consideration. In decision block 836, it is determined whether or not at least one of these coarse-grained bandwidth allocation factors $f_i$ corresponding to the wavelength currently under consideration may support the requested bandwidth. If so, then decision block 836 exits along the YES path, and in block 844 the lightpath is selected that may have the smallest value of coarse-grained bandwidth allocation factors $f_i$ that supports the requested bandwidth.

However, if none of the coarse-grained bandwidth allocation factors $f_i$ corresponding to the wavelength currently under consideration supports the requested bandwidth, then decision block 836 exits along the NO path. In decision block 840, it is determined whether or not one or more wavelength exists that have not yet been considered that may support the requested bandwidth. If so, then decision block 840 selects one of those wavelengths as the next wavelength under consideration, and exits along the YES path. The YES path from decision block 840 returns the process to decision block 816 for further comparisons.

However, if no wavelength exists that has not yet been considered, then decision block 840 exits along the NO path. Then in block 852 the wavelength among all those considered that had the largest value of a coarse-grained bandwidth allocation factors $f_i$ is selected. In decision block 856 it is determined whether or not to attempt to schedule the transmission by inserting a delay time. If so, then decision block 856 exits along the YES path and returns to decision block 808. However, if not, then decision block 856 exits along the NO path, and in block 860 the process segments the data burst.

Both block 844 and block 860 lead to block 848, where the data burst transmission is scheduled on the selected wavelength, using the lightpath determined, or, in some cases, the segmentation determined, in the above process.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
    a network processor ingress module to maintain a set of weighting factors and coarse-grained bandwidth allocation factors; and
    a network processor egress module to receive network statistical data to support said set of weighting factors, wherein said set of coarse-grained bandwidth allocation factors are obtained at least in part by summing a plurality of fine-grained bandwidth allocation factors, each of said fine-grained bandwidth allocation factors being obtained by multiplying a corresponding one of said set of weighting factors by a ratio of an average bit rate of a lightpath segment in the network to an overall average bit rate of all lightpath segments forming a plurality of lightpaths between an ingress node and an egress node.

2. The apparatus of claim 1, wherein the network is a photonic Burst-switched network.

3. The apparatus of claim 1, wherein said network processor ingress module updates said set of weighting factors based upon said network statistical data.

4. The apparatus of claim 1, wherein said network processor ingress module determines a lightpath for a requested bandwidth by comparing said requested bandwidth to said coarse-grained bandwidth allocation factors.

5. A method comprising:
    determining a plurality of weighting factors for each of a plurality of lightpath segments in a network;
    calculating a fine-grained bandwidth allocation factor for each one of the plurality of lightpath segments in the network by multiplying the weighting factor corresponding to the lightpath segment with a bandwidth utilization of the lightpath segment, wherein the bandwidth utilization of each of the lightpath segments is determined by a ratio of an average bit rate of the lightpath segment to an overall average bit rate of all lightpath segments forming a lightpath between an ingress node and an egress node;
    calculating a coarse-grained bandwidth allocation factor for each of a plurality of lightpaths formed from said lightpath segments between an ingress node and an egress node by summing the fine-grained bandwidth allocation factors of each of the lightpath segments making up each of the plurality of lightpaths;
    comparing a requested bandwidth with each of said coarse-grained bandwidth allocation factors for each of said lightpaths; and
    selecting one of said lightpaths that satisfies said requested bandwidth based on one of said coarse-grained bandwidth factors.

6. The method of claim 5, further comprising preselecting a first wavelength for transmission that matches a transmission priority of said requested bandwidth.

7. The method of claim 6, further comprising utilizing a second wavelength that matches said transmission priority of said requested bandwidth when none of said coarse-grained bandwidth allocation factors corresponding to said first wavelength indicates support of said requested bandwidth.

8. The method of claim 7, further comprising segmenting a data burst of said requested bandwidth when none of said coarse-grained bandwidth allocation factors corresponding to said second wavelength indicates support of said requested bandwidth.

9. The method of claim 8, further comprising delaying transmission of said data burst when none of said coarse-grained bandwidth allocation factors corresponding to said second wavelength indicates support of said requested bandwidth.

10. The method of claim 5, wherein said determining a plurality of weighting factors includes utilizing network traffic statistical data.

11. The method of claim 10, further comprising transferring said network traffic statistical data from a switching node.

12. An apparatus, comprising:
 circuitry configured to determine a plurality of weighting factors for each of a plurality of lightpath segments in a network;
 circuitry configured to calculate a fine-grained bandwidth allocation factor for each one of the plurality of lightpath segments in the network by multiplying the weighting factor corresponding to the lightpath segment with a ratio of an average bit rate of the lightpath segment to an overall average bit rate of all lightpath segments forming a plurality of lightpaths between an ingress node and an egress node;
 circuitry configured to calculate a coarse-grained bandwidth allocation factor for each of the plurality of lightpaths by summing the fine-grained bandwidth allocation factors of each of the lightpath segments making up each of the plurality of lightpaths;
 circuitry configured to compare a requested bandwidth with each of said coarse-grained bandwidth allocation factors for each of said lightpaths; and
 circuitry configured to select one of said lightpaths that satisfies said requested bandwidth based on one of said coarse-grained bandwidth factors.

13. The apparatus of claim 12, further comprising circuitry configured to preselect a first wavelength for transmission that matches a transmission priority of said requested bandwidth.

14. The apparatus of claim 13, further comprising circuitry configured to utilize a second wavelength that matches said transmission priority of said requested bandwidth when none of said coarse-grained bandwidth allocation factors corresponding to said first wavelength indicates support of said requested bandwidth.

15. The apparatus of claim 14, further comprising circuitry configured to segment a data burst of said requested bandwidth when none of said coarse-grained bandwidth allocation factors corresponding to said second wavelength indicates support of said requested bandwidth.

16. The apparatus of claim 15, further comprising circuitry configured to delay transmission of said data burst when none of said coarse-grained bandwidth allocation factors corresponding to said second wavelength indicates support of said requested bandwidth.

17. The apparatus of claim 12, wherein said circuitry configured to determine a plurality of weighting factors includes circuitry configured to utilize network traffic statistical data.

18. The apparatus of claim 17, further comprising transferring said network traffic statistical data from a switching node.

19. The apparatus of claim 12, wherein the network is a photonic burst-switched network.

20. A computer-readable medium, including programming code that when executed by a processor performs operations comprising:
 determining a plurality of weighting factors for each of a plurality of lightpath segments in a network;
 calculating a fine-grained bandwidth allocation factor for each one of the plurality of lightpath segments in the network by multiplying the weighting factor corresponding to the lightpath segment with a bandwidth utilization of the lightpath segment, wherein the bandwidth utilization of each of the lightpath segments is determined by a ratio of an average bit rate of the lightpath segment to an overall average bit rate of all lightpath segments forming a lightpath between an ingress node and an egress node;
 calculating a coarse-grained bandwidth allocation factor for each of a plurality of lightpaths formed from said lightpath segments between an ingress node and an egress node by summing the fine-grained bandwidth allocation factors of each of the lightpath segments making up each of the plurality of lightpaths;
 comparing a requested bandwidth with each of said coarse-grained bandwidth allocation factors for each of said lightpaths; and
 selecting one of said lightpaths that satisfies said requested bandwidth based on one of said coarse-grained bandwidth factors.

21. The computer-readable media of claim 20, wherein said operations further compnse preselecting a first wavelength for transmission that matches a transmission priority of said requested bandwidth.

22. The computer-readable media of claim 21, wherein said operations further comprise utilizing a second wavelength that matches said transmission priority of said requested bandwidth when none of said coarse-grained bandwidth allocation factors corresponding to said first wavelength indicates support of said requested bandwidth.

23. The computer-readable media of claim 22, wherein said operations further comprise segmenting a data burst of said requested bandwidth when none of said coarse-grained bandwidth allocation factors corresponding to said second wavelength indicates support of said requested bandwidth.

24. The computer-readable media of claim 22, wherein said operations further comprise delaying transmission of said data burst when none of said coarse-grained bandwidth allocation factors corresponding to said second wavelength indicates support of said length of bandwidth.

25. The computer-readable media of claim 20, wherein said determining a plurality of weighting factors includes utilizing network traffic statistical data.

26. The computer-readable media of claim 25, wherein said operations further comprise transferring said network traffic statistical data from a switching node.

* * * * *

UNITED STATES PATENT AND TRADEMARK OFFICE
CERTIFICATE OF CORRECTION

PATENT NO. : 7,483,631 B2  Page 1 of 1
APPLICATION NO. : 10/328571
DATED : January 27, 2009
INVENTOR(S) : Ovadia et al.

It is certified that error appears in the above-identified patent and that said Letters Patent is hereby corrected as shown below:

In column 16, at line 34 delete, "compnse" and insert --comprise--.

Signed and Sealed this

Third Day of August, 2010

David J. Kappos
*Director of the United States Patent and Trademark Office*